United States Patent
Tomita et al.

(10) Patent No.: US 10,990,070 B2
(45) Date of Patent: Apr. 27, 2021

(54) PLANT ANALYZER, PLANT ANALYSIS METHOD, AND PROGRAM THEREOF

(71) Applicant: Mitsubishi Hitachi Power Systems, Ltd., Kanagawa (JP)

(72) Inventors: Yasuoki Tomita, Yokohama (JP); Katsuhiko Abe, Yokohama (JP); Shintaro Kumano, Tokyo (JP); Motoshi Takasu, Yokohama (JP); Etsushi Kanno, Yokohama (JP); Takahiro Kawaguchi, Yokohama (JP); Takayoshi Isoda, Yokohama (JP); Yuki Enomoto, Yokohama (JP); Nobuhiro Osaki, Yokohama (JP); Kazuyuki Misawa, Yokohama (JP); Akihisa Endo, Yokohama (JP); Masao Ogino, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 97 days.

(21) Appl. No.: 16/069,036

(22) PCT Filed: Dec. 8, 2016

(86) PCT No.: PCT/JP2016/086538
§ 371 (c)(1),
(2) Date: Jul. 10, 2018

(87) PCT Pub. No.: WO2017/122468
PCT Pub. Date: Jul. 20, 2017

(65) Prior Publication Data
US 2019/0018380 A1 Jan. 17, 2019

(30) Foreign Application Priority Data
Jan. 14, 2016 (JP) .............................. JP2016-005335

(51) Int. Cl.
*F01D 21/00* (2006.01)
*F02C 6/00* (2006.01)
*G05B 19/042* (2006.01)
*F02C 6/18* (2006.01)
(Continued)

(52) U.S. Cl.
CPC ......... *G05B 19/042* (2013.01); *F01D 21/003* (2013.01); *F02C 6/00* (2013.01);
(Continued)

(58) Field of Classification Search
None
See application file for complete search history.

(56) References Cited

U.S. PATENT DOCUMENTS 6,425,239 B2 * 7/2002 Hoffmann ................. F23R 3/34
60/746
6,681,155 B1 * 1/2004 Fujita .................... G05B 13/042
60/660
(Continued)

FOREIGN PATENT DOCUMENTS

EP 2187283 A1 * 5/2010 ........... F01D 21/003
JP 59-003335 1/1984
(Continued)

OTHER PUBLICATIONS

International Search Report dated Feb. 21, 2017 in International Application No. PCT/JP2016/086538, with English-language translation.
(Continued)

*Primary Examiner* — Jennifer L Norton
(74) *Attorney, Agent, or Firm* — Wenderoth, Lind & Ponack, L.L.P.

(57) ABSTRACT

A state quantity acquiring unit is configured to acquire a state quantity of a turbine. A time calculation unit is configured to calculate an operable time at an over firing operation of the turbine based on a design life of the turbine (Continued)

and a state quantity. A distance calculation unit configured to calculate a Mahalanobis distance based on the state quantity. A determination unit configured to determine whether or not the over firing operation of the turbine is possible by the Mahalanobis distance and the operable time.

6 Claims, 10 Drawing Sheets

(51) Int. Cl.
  *F02C 7/00* (2006.01)
  *G06Q 10/06* (2012.01)
  *G06Q 50/06* (2012.01)

(52) U.S. Cl.
  CPC ............. *F02C 6/18* (2013.01); *F02C 7/00* (2013.01); *G06Q 10/063* (2013.01); *G06Q 50/06* (2013.01); *F05D 2220/31* (2013.01); *F05D 2220/32* (2013.01); *F05D 2220/76* (2013.01); *F05D 2260/80* (2013.01); *G05B 2219/2619* (2013.01); *G05B 2219/2639* (2013.01); *Y02E 20/16* (2013.01)

(56) References Cited

U.S. PATENT DOCUMENTS

| | | | | |
|---|---|---|---|---|
| 2003/0149547 A1* | 8/2003 | Nakao | ............... | G05B 23/024 702/183 |
| 2005/0015283 A1 | 1/2005 | Iino et al. | | |
| 2009/0293457 A1* | 12/2009 | Grichnik | ............... | F01N 3/208 60/286 |
| 2010/0198555 A1* | 8/2010 | Takahama | ............... | F01D 19/00 702/179 |
| 2015/0293531 A1* | 10/2015 | Mikami | ............. | G05B 23/0235 702/182 |
| 2018/0328290 A1* | 11/2018 | Tanaka | ................. | F01D 25/005 |
| 2019/0018384 A1* | 1/2019 | Tomita | ............... | G05B 19/0428 |
| 2019/0264573 A1* | 8/2019 | Nagano | ..................... | F02C 7/00 |
| 2020/0410042 A1* | 12/2020 | Hiroe | ..................... | G06F 17/18 |

FOREIGN PATENT DOCUMENTS

| | | | | |
|---|---|---|---|---|
| JP | 2003-013744 | | 1/2003 | |
| JP | 2005-301909 | | 10/2005 | |
| JP | 6062581 | | 1/2017 | |
| WO | WO-2006110244 A2 * | 10/2006 | ......... | G06F 17/5009 |

OTHER PUBLICATIONS

Written Opinion of the International Searching Authority dated Feb. 21, 2017 in International Application No. PCT/JP2016/086538, with English-language translation.

* cited by examiner

☒ WHETHER OR NOT REACH DESIGN LIFE BEFORE INSPECTION TIMING BY OVER FIRING OPERATION

☑ WHETHER OR NOT ABNORMAL IS PREDICTED

☑ WHETHER OR NOT COMMENSURATE WITH THE REVENUE

| SUN | MON | TUE | WED | THR | FRI | SAT |
|---|---|---|---|---|---|---|
|  |  | 1 | 2<br>TODAY | 3<br>BL | 4<br>BL | 5<br>BL |
| 6<br>OF | 7<br>BL | 8<br>BL | 9<br>BL | 10<br>BL | 11<br>BL | 12<br>BL |
| 13<br>OF | 14<br>BL | 15<br>BL | 16<br>BL | 17<br>BL | 18<br>BL | 19<br>BL |
| 20<br>OF | 21<br>BL | 22<br>BL | 23<br>BL | 24<br>OF | 25<br>OF | 26<br>BL |
| 27<br>OF | 28<br>INSPECTION | 29 | 30 |  |  |  |

PLANT ANALYZER, PLANT ANALYSIS METHOD, AND PROGRAM THEREOF

TECHNICAL FIELD

The present invention relates to a plant analyzer, a plant analysis method, and a program thereof.

This application claims priority right to Japanese Patent Application No. 2016-005335 filed in Japan on Jan. 14, 2016, the content of which is incorporated herein by reference.

BACKGROUND TECHNOLOGY

In thermal power plants equipped with gas turbine and steam turbine, an operation at base load (rated load, 100% load) and an operation at partial load (for example, 75% load) are operated according to electric power demand. Further, Patent Document 1 discloses a technique for performing an over firing operation by determining whether or not the over firing operation (heavy load operation) is possible by a cumulative load of gas turbine components. The over firing operation means to operate a turbine at a load (for example, 110% load) higher than the load of a base load operation (100% load).

PRIOR ART DOCUMENT

Patent Document

[Patent Document 1] Japanese Unexamined Patent Application Publication No. 2003-13744

SUMMARY OF THE INVENTION

Problems to be Solved by the Invention

In the technique disclosed in Patent Document 1, the maintenance component is prevented from being damaged during the heavy load operation by determining whether or not it is possible to secure a predetermined operation maintenance period determined from the replacement timing of the maintenance components in a case where the heavy load operation calculated from the cumulative load of maintenance components of a gas turbine is carried out. However, the maintenance components generally have not been designed to be operated under heavy load. Therefore, since the over firing operation has a large load on the turbine, there is a possibility in that damage of the maintenance component may occur in a shorter time than an operable time calculated by the technique described in Patent Document 1.

The object of the present invention is to provide a plant analyzer capable of accurately determining whether or not an operation in the over firing operation is possible, a plant analysis method, and a program thereof.

Means for Solving the Problem

A first aspect of the present invention provide a plant analyzer including: a state quantity acquiring unit configured to acquire a state quantity of a turbine; a time calculation unit configured to calculate an operable time at an over firing operation of the turbine based on a design life of the turbine and the state quantity, a distance calculation unit configured to calculate a Mahalanobis distance based on the state quantity; and a determination unit configured to determine whether or not the over firing operation of the turbine is possible by the Mahalanobis distance and the operable time.

A second aspect of the present invention provides the plant analyzer according to the first aspect, and the determination unit configured to determine whether or not a power selling price is less than a predetermined threshold value and whether or not the over firing operation of the turbine is possible by the Mahalanobis distance and the operable time.

A third aspect of the present invention provides the plant analyzer according to the first or second aspect and the plant analyzer further includes a variable calculation unit configured to calculate a history variable with respect to a history of the state quantity; and wherein the time calculation unit is configured to calculate the operable time at the over firing operation of the turbine based on a history variable corresponding to the design life of the turbine and the calculated history variable.

A fourth aspect of the present invention provides the plant analyzer according to any one of the first to the third aspects of the present invention, and the time calculation unit is configured to calculate the operable time to prevent the turbine from reaching the product life until the turbine inspection timing.

A fifth aspect the present invention provides the plant analyzer according to any one of the first to fourth aspects, and the plant analyzer further includes a failure detection unit configured to detect a fault of the turbine based on the Mahalanobis distance calculated by the distance calculation unit.

A sixth aspect of the present invention provides a plant analysis method including the steps of acquiring a state quantity of a turbine including a temperature of the turbine; calculating an operable time at the over firing operation of the turbine based on a design life of the turbine and a calculated state quantity; calculating a Mahalanobis distance based on the state quantity; and determining whether or not the over firing operation of the turbine is possible by the Mahalanobis distance and the operable time.

A seventh aspect of the present invention provides a program causes a computer to function as: a state quantity acquiring unit configured to acquire a state quantity of a turbine; a time calculation unit configured to calculate an operable time at an over firing operation of the turbine based on a design life of the turbine and the state quantity; a distance calculation unit configured to calculate a Mahalanobis distance based on the state quantity; and a determination unit configured to determine whether or not the over firing operation of the turbine is possible by the Mahalanobis distance and the operable time.

Effect of Invention

According to at least one aspect of the above described aspects, the plant analyzer determines whether or not an operation in the over firing operation is possible based on a Mahalanobis distance calculated from a state quantity of the turbine in addition to an operable time in the over firing operation. As a result, the plant analyzer can accurately determine whether or not an operation in the over firing operation is possible.

MODE FOR CARRYING OUT THE INVENTION

First Embodiments

Figure 1:
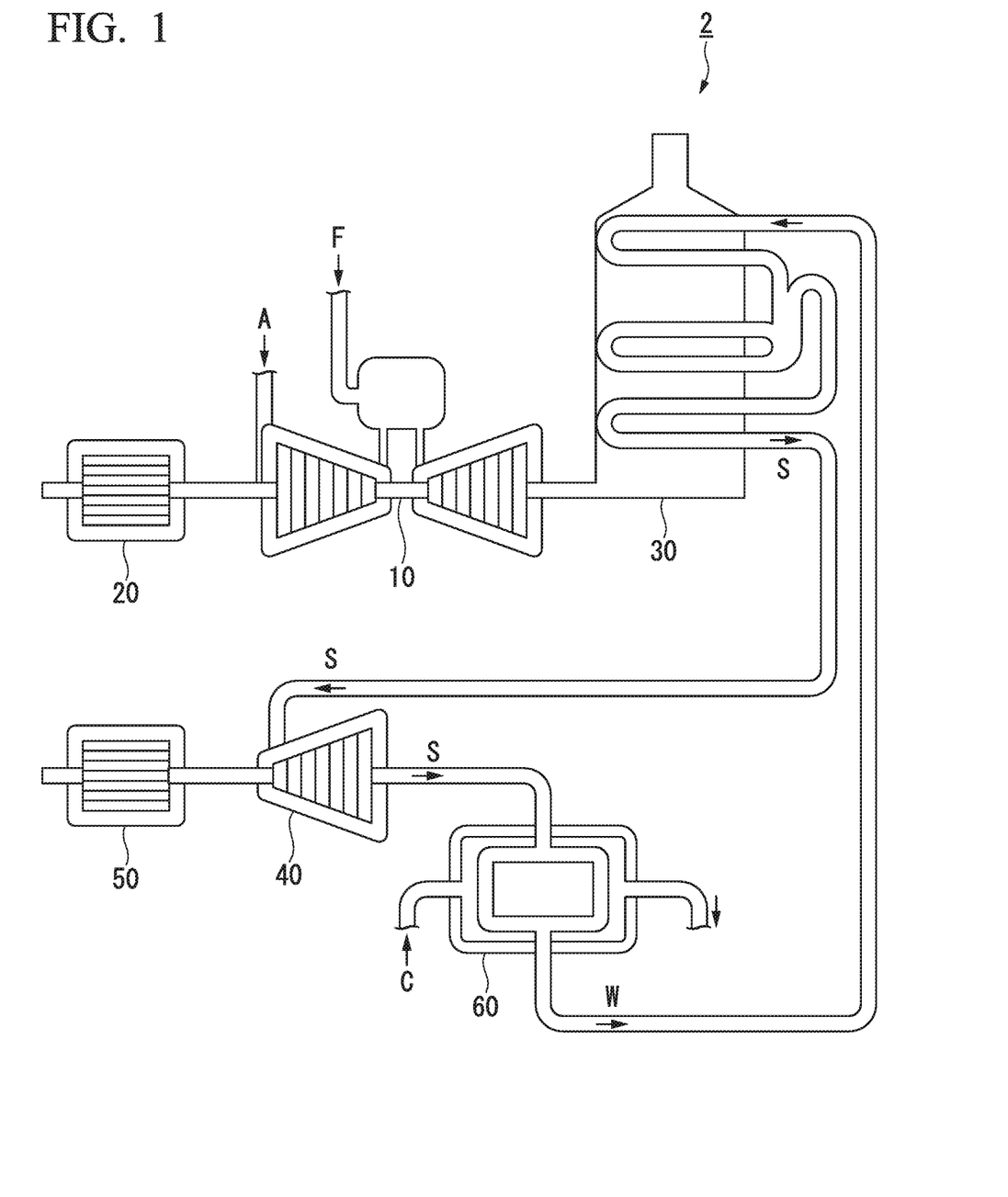
FIG. 1 is a configuration diagram of a power plant according to an example of an analysis target.

A first embodiment will be described in detail below with reference to the drawings. FIG. 1 is a schematic diagram of a power plant according to an example of an analysis target.

The plant analyzer 1 determines whether or not an over firing operation of a turbine provided a power plant 2 is possible. In the prevent embodiment, the power plant 2 which is a target of analysis of the plant analyzer 1 is a GTCC plant equipped with a gas turbine and a steam turbine as shown in FIG. 1. The power plant 2 shown in FIG. 1 includes a gas turbine 10, a first generator 20, a waste heat recovery boiler 30, a steam turbine 40, a second generator 50, and a condenser 60. The gas turbine 10 is driven by a high-temperature and high-pressure combustion gas generated by compressing air A and combusting fuel F in the compressed air. The first generator 20 generates electricity by the drive of the gas turbine 10. The waste heat recovery boiler 30 generates steam S by heat of an exhaust gas from the gas turbine 10. The steam turbine 40 is driven by the steam S from the waste heat recovery boiler 30. The second generator 50 generates electricity by the drive of the steam turbine 40. The condenser 60 returns the steam S exhausted from the steam turbine 40 to a steam condensate W by cooling the steam S with the coolant C. The steam condensate W returned by the condenser 60 is supplied to the waste heat recovery boiler 30. In addition, the power plant 2 shown in FIG. 1 is an example of an analysis target, and the analysis target of the plant analyzer 1 may be another power plant such as a conventional plant.

Figure 2:
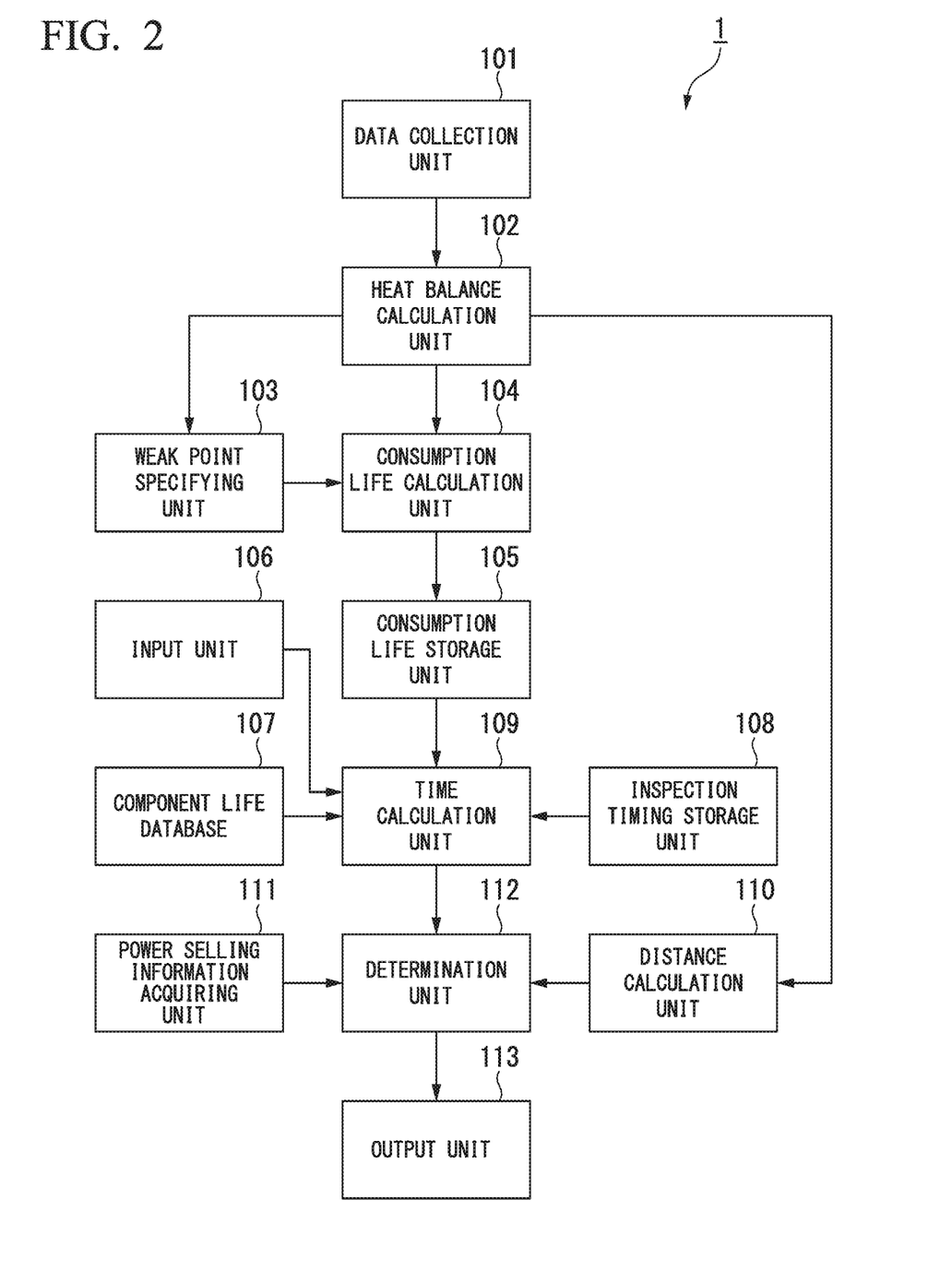
FIG. 2 is a schematic block diagram showing a configuration of a plant analyzer according to a first embodiment.

FIG. 2 is a schematic block diagram showing a configuration of a plant analyzer according to a first embodiment.

The plant analyzer 1 includes a data collection unit 101, a heat balance calculation unit 102, a weak point specifying unit 103, a consumption life calculation unit 104, a consumption life storage unit 105, an input unit 106, a component life database 107, an inspection timing storage unit 108, a time calculation unit 109, a distance calculation unit 110, a power selling information acquiring unit 111, a determination unit 112, and an output unit 113.

The data collection unit 101 collects an operation data of the power plant 2, such as a turbine, in real time from the power plant 2. Specifically, the data collection unit 101 collects an operation data from a sensor provided in the turbine or like at a predetermined collection cycle (e.g., 5 minutes). The collection cycle is a short period of time so that the immediacy of monitoring is not lost. The operation data is collected regardless of whether a power plant is in operation. Examples of operating data include flow rate, pressure, temperature, vibration, and other state quantities. The sensor provided in the turbine may include a sensor for a special measurement in addition to a commonly used sensor. Examples of the sensor for special measurement include sensor for measuring a gas temperature of the fluid which has spent its workload in the final stage blade and a chip clearance sensor for measuring a gap between a blade tip and a chamber. The data collection unit 101 is an example of a state quantity collecting unit for acquiring a state quantity of the turbine.

The heat balance calculation unit 102 calculates a heat balance of the power plant 2, such as the turbine, based on the operation data collected by the data collection unit 101. The heat balance means temperature, pressure, enthalpy, flow rate, and other state quantities in each of a plurality of parts of the power plant 2, such as the turbine. The heat balance calculation unit 102 calculates the heat balance by simulation based on the operation data. Examples of a simulation method for calculating the heat balance include Finite Element Method (FEM) and Computational Fluid Dynamics (CFD). The heat balance calculation unit 102 is an example of the state quantity collecting unit for acquiring a state quantity of a turbine.

The weak point specifying unit 103 specifies a component of the turbine that becomes the highest temperature in all components of the turbine during high load operation based on the heat balance calculated by the heat balance calculation unit 102.

The consumption life calculation unit 104 calculates the LMP (Larson-Miller Parameter) value Lc indicating a degradation amount of each component in the latest collection cycle based on the heat balance calculated by the heat balance calculation unit 102. In other words, the consumption life calculation unit 104 is an example of a variable calculation unit for calculating history variables relating to history of state quantities. The LMP value Lc is a parameter calculated by the following equation (1).

[Equation 1]

$$L_c = T_c(\log t + C) \tag{1}$$

Tc denotes a thermodynamics temperature of a component. The thermodynamics temperature is equivalent to the Celsius temperature plus 273.15. The thermodynamics temperature of the component is specified by the temperature of a region specified by the weak point specifying unit 103 among the heat balance calculated by the heat balance calculation unit 102. T denotes an operating time of the turbine at the temperature Tc. That is, the time t is equal to the collection cycle by the data collection unit 101. C is a constant defined by the material of the component. For example, when the material of the component is a low carbon steel or chromium molybdenum steel, the constant C may be 20. Also, when the material of the component is stainless steel, the constant C may be 1.5.

Thus, the LMP value is a parameter specified from the thermodynamics temperature of the component and the operating time. That is, the LMP value is an example of a history variable relating to a history of the temperature applied on a component. The LMP value can represent the state of creep deformation.

Further, the consumption life calculation unit 104 calculates a consumption life tc of the component converted by a rated temperature Ts of the component according to the following equation (2) based on the calculated LMP value Lc.

[Equation 2]

$$t_c = 10^{\frac{L_c}{T_s} - C} \quad (2)$$

The consumption life storage unit 105 stores an integrated value (hereinafter referred to as a cumulative consumption life Σtc) of the consumption life tc calculated by the consumption life calculation unit 104 for each component of the turbine.

The input unit 106 receives an input of an execution command of a process of determining whether or not the over firing operation is possible from an operator. For example, the input unit 106 receives the input of the execution command by pressing a determination start button.

The component life database 107 stores a design life ts and a rated temperature Tc of each component of the turbine.

The inspection timing storage unit 108 stores a predetermined inspection timing of a turbine. The inspection timing is the date and time designated by the operated of the plant analyzer 1.

The time calculation unit 109 calculates the operable time to in the over firing operation of the turbine based on the cumulative consumption life Σtc of each component, the design life ts of each component, and the inspection timing of the turbine. Specifically, the time calculation unit 109 calculates a remaining life tl of the component by subtracting the cumulative consumption life Σtc from the design life ts. The remaining life tl is an operable time of the component at the rated temperature Tc. The time calculation unit 109 calculates the LMP value Ll according to the following equation (3) based on the calculated remaining life tl and the rated temperature Tc of the component. Then, the time calculation unit 109 calculates the operable time to which is for preventing all components from reaching the product life until the inspection timing based on the LMP value Ll and the over firing temperature To according to the following equation (4).

[Equation 3]

$$L_l = T_s(\log t_l + C) \quad (3)$$

[Equation 4]

$$t_o = 10^{\frac{L_l}{T_o} - C} \quad (4)$$

The distance calculation unit 110 calculates a Mahalanobis distance of the turbine based on the heat balance calculated by heat balance calculation unit 102. The Mahalanobis distance indicates the degree of divergence between the state of a turbine at a specific time and a normal state thereof. Specifically, the distance calculation unit 110 calculates the Mahalanobis distance by projecting the heat balance calculated by the heat balance calculation unit 102 in a unit space constituted by a plurality of state quantities acquired from a turbine in the past. The unit space refers to a data group that is a basis for calculating the Mahalanobis distance. In addition, the Mahalanobis distance is a distance that is weighted in accordance with a dispersion or correlation of the state quantities in the unit space, and the Mahalanobis distance becomes larger as the degree of similarity with the data group in the unit space is lower.

The power selling information acquiring unit 111 acquires a power selling information indicating a current power selling price. The power selling information acquiring unit 111 may acquire the power selling information from an external server via the Internet, or the power selling information may be input by the operator.

The determination unit 112 determines whether or not the over firing operation of the turbine is possible based on the operable time calculated by the time calculation unit 109, the Mahalanobis distance calculated by the distance calculation unit 110, and the power selling information acquired by the power selling information acquiring unit 111. The determination unit 112 determines that the over firing operation should not be carried out when the operable time is less than a predetermined time. Further, when the Mahalanobis distance exceeds the possibility determination threshold value, the determination unit 112 determines that an over firing operation should not be carried out. In addition, the determination unit 112 determines that the firing operation should not be carried out when the power selling price indicated by the power selling information is less than a predetermined price.

The output unit 113 outputs proposal information indicating the determination result by the determination unit 112. Examples of output formats for the proposal information include display on a display, recording on storage medium, and printing to a sheet. Examples of the proposed information include a list whether or not the over firing operation is possible based on the operable time, whether or not the over firing operation is possible based on the Mahalanobis distance, and whether or not the over firing operation is possible based on the power selling price.

Here, the operation of the plant analyzer according to the present embodiment will be described.

Figure 3:
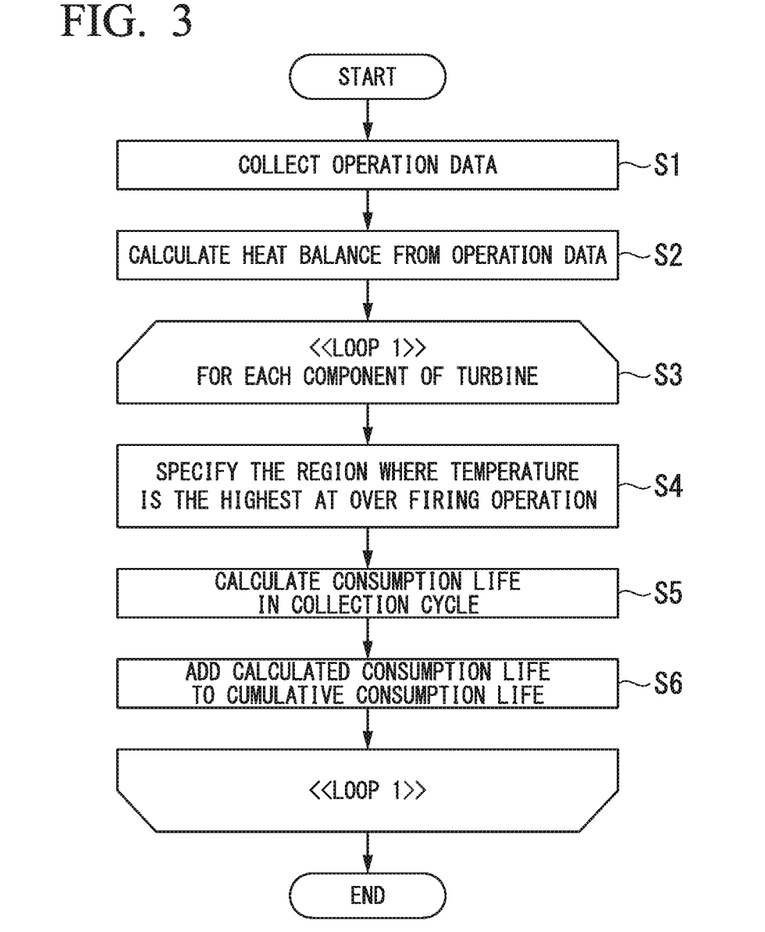
FIG. 3 is a flow chart showing an operation of a collecting cycle of the plant analyzer according in the first embodiment.

FIG. 3 is a flow chart showing an operation for each collection cycle of the plant analyzer according to the first embodiment.

The plant analyzer 1 performs the following processing for each collection cycle. First, the data collection unit 101 collects operation data of the power plant 2, such as a turbine, from sensors provided in the turbine or the like (Step S1). Next, the heat balance calculation unit 102 calculates the heat balance of the power plant 2, such as a turbine, as an input of the collected operation data (Step S2).

Next, the plant analyzer 1 selects components of the turbine one by one, and performs the processing of Step S4 to Step S6 shown below for each of the selected components (Step S3).

First, the weak point specifying unit 103 specifies region of the selected component that is the highest temperature during the over firing operation based on at least one of the current calculation result and the past calculation result of the heat balance calculation unit 102 (Step S4).

Next, the consumption life calculation unit 104 calculates a consumption life during the latest collection cycle t of the selected component using a temperature T related to a region specified by the weak point specifying unit 103 in the heat balance calculated by the heat balance calculation unit 102 (Step S5). That is, the consumption life calculation unit 104 calculates the consumption life according to Equations (1) and (2) described above. The consumption life calculation unit 104 adds the calculated consumption life to the cumulative consumption life associated with the selected component stored in the consumption life storage unit 105 (Step S6). As a result, the consumption life calculation unit 104 updates the cumulative consumption life stored in the consumption life storage unit 105.

The plant analyze 1 executes the processing from the above Step S1 to Step S6 for every collection cycle, so that the cumulative consumption life stored in the consumption life storage unit 105 can be kept in the latest state.

Here, the determining operation whether or not the over firing operation according to the plant analyzer 1 of the present embodiment is possible will be described.

Figure 4:
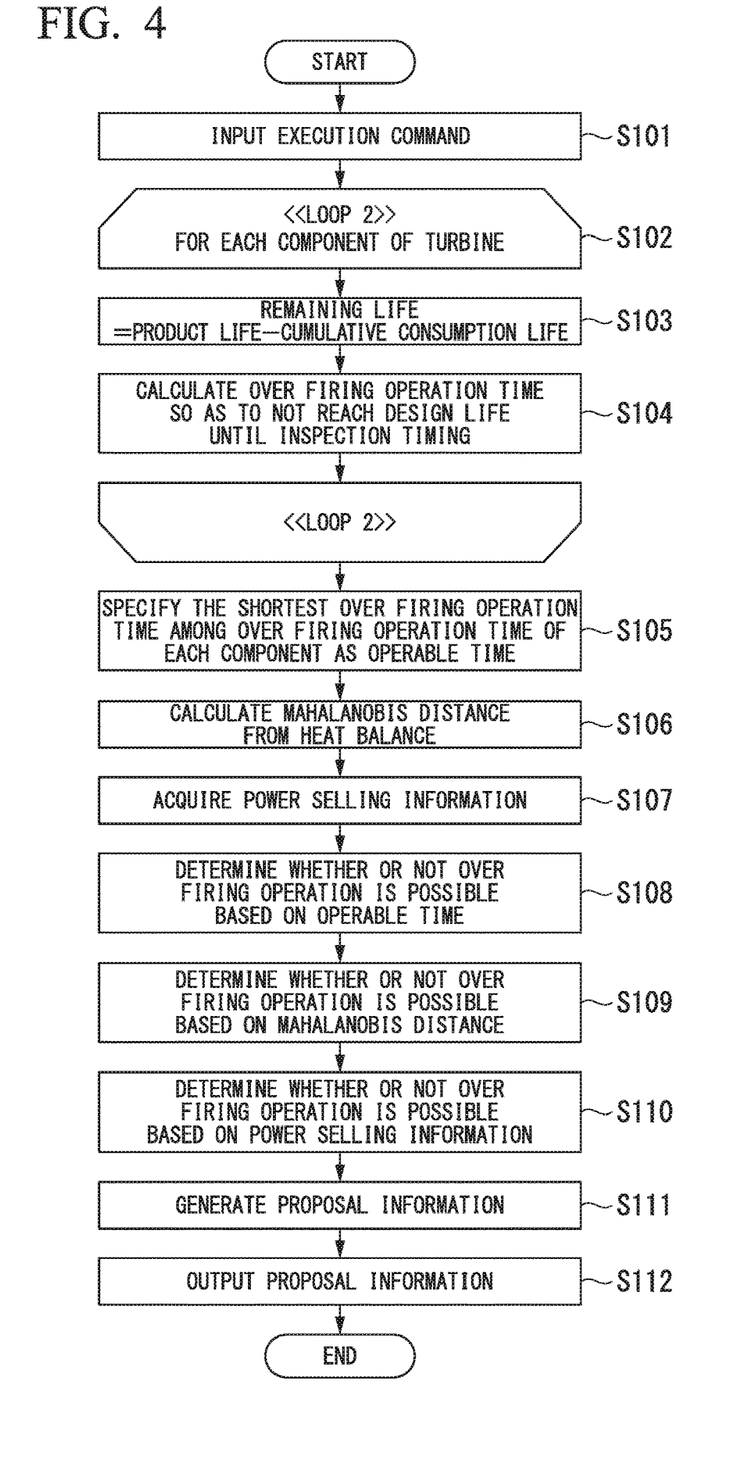
FIG. 4 is a flow chart showing a determining operation whether or not an over firing operation by the plant analyzer according to the first embodiment is possible.

FIG. 4 is a flow chart showing the determining operation whether or not the over firing operation according to the plant analyzer according to the first embodiment is possible. When the operator inputs an execution command of a processing of determining whether or not the over firing operation in the plant analyzer 1 is possible, the input unit 106 receives input of the execution command (Step S101). The time calculation unit 109 selects one component of the turbine one by one, and performs the processing of steps S103 to S104 shown below for each of the selected component (Step S102).

First, time calculation unit 109 calculates the remaining life of the selected component by subtracting the cumulative consumption life associated with the selected component stored in the consumption life storage unit 105 from the product life associated with the selected component stored in the component life database 107 (Step S103). Next, the time calculation unit 109 calculates the maximum over firing operation time so that the selected component does not reach the design life during a period from the present time to the inspection timing (Step S104). That is, the time calculation unit 109 calculates the over firing operation time according to Equations (3) and (4) described above.

When the time calculation unit 109 executes the processing of Step S103 through Step S104 for all components, the shortest over firing operation time among the calculated over firing operation of each component is specified as the operable time which is for preventing the turbine from reaching the product life until the inspection timing (Step S105).

The distance calculation unit 110 calculates the Mahalanobis distance based on the latest heat balance calculated by the heat balance calculation unit 102 (Step 106). Further, the power selling information acquiring unit 111 acquires power selling information relating to the power selling price (Step 107).

The determination unit 112 determines whether the over firing operation of the turbine is possible based on the operable time calculated by the time calculation unit 109 (Step 108). Specifically, the determination unit 112 determines that the over firing operation should not be carried out when the operable time calculated by the time calculation unit 109 is less than a predetermined time (e.g., 1 hour). Next, the determination unit 112 determines whether or not the over firing operation of the turbine is possible based on the Mahalanobis distance calculated by the distance calculation unit 110 (Step 109). Specifically, the determination unit 112 determines that the over firing operation should not be carried out in a case where the Mahalanobis distance exceeds the possibility determination threshold value (e.g., 2). The determination unit 112 determines whether or not the over firing operation of the turbine is possible based on the power selling information acquired by the power selling information acquiring unit 111 (Step S110). Specifically, the determination unit 112 determines that the over firing operation should not be carried out when the power selling price indicated by the power selling information is less than a predetermined price (e.g., an annual average power selling price).

The output unit 113 generates a proposal information indicating each determination result based on the determination result of step S108 through step S110 by the determination unit 112 (Step S111). The output unit 113 outputs the generated proposal information (Step S112).

Figure 5:
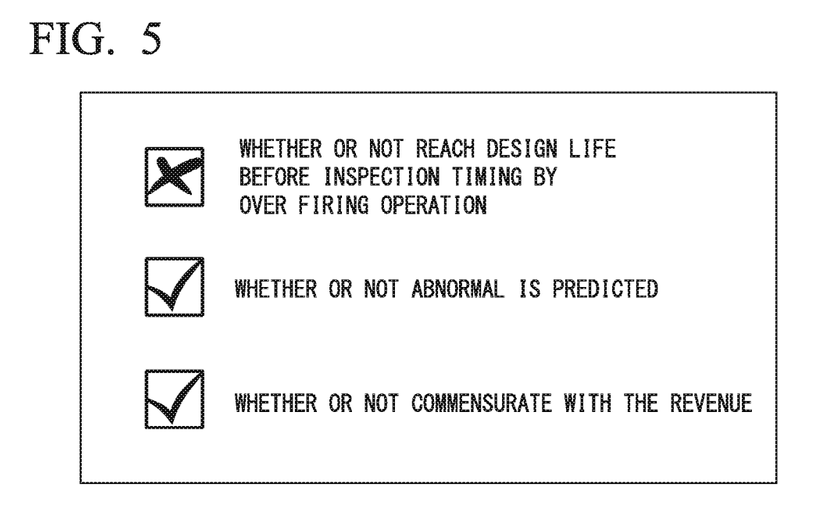
FIG. 5 shows an example of proposal information outputted by the plant analyzer according to the first embodiment.

FIG. 5 is an example of the proposal information outputted by the plant analyzer according to the first embodiment.

As shown in FIG. 5, the output unit 113 outputs a list of whether or not the over firing operation is possible based on the operable time, whether or not the over firing operation is possible based on the Mahalanobis distance, and whether or not the over firing operation is possible based on the power selling price. Accordingly, it is possible for the operator to determine whether or not the turbine is allowed to carry out the over firing operation by referring to the proposal information. In addition, the operator may allow the turbine to carry out the over firing operation even in a case where some conditions indicate the over firing operation should not be carried out.

Thus, according to this embodiment, the plant analyzer 1 calculates operable time at the turbine over firing operation based on the design life of the turbine and the LMP value indicative of the temperature history of the turbine. The turbine strain increases as temperature increases. Therefore, the plant analyzer 1 can accurately specify the remaining life of the turbine by managing the turbine life based on turbine temperature history. Accordingly, the plant analyzer 1 according to the present embodiment can accurately calculate the operable time in the over firing operation.

According to the present embodiment, the plant analyzer 1 determines whether or not the over firing operation of the turbine is possible based on the operable time. Accordingly, the operator of the turbine can easily determine whether or not the turbine should carry out the over firing operation. In addition, the plant analyzer 1 according to the present embodiment outputs whether or not the over firing operation is possible as the proposal information, however it is not limited thereto. For example, the plant analyzer 1 according to another embodiment may automatically control the operator of the turbine according to the determination result of the determination unit 112. Further, the plant analyzer 1 according to still another embodiment may not determine whether or not the over firing operation of the turbine is possible, and may output the operable time. In still another embodiment, the plant analyzer 1 may calculate the operable time without using the LMP value. For example, the plant analyzer 1 according to still another embodiment may calculate the operable time based on a history variable other than the LMP value. Further, the plant analyzer 1 according to still another embodiment may calculate an operable time based on an integrated value of an operation time independent of the temperature.

Further, according to the present embodiment, the plant analyzer 1 calculates the operable time which is for preventing the turbine from reaching the product life until the inspection timing of the turbine. Accordingly, when the turbine carries out the over firing operation according to the operable time, the component that has reached the design life can be replaced at the next inspection timing. That is, by carrying out the over firing operation of the turbine according to the operable time, it is possible to reduce the possibility that the turbine cannot be operated before the next inspection timing.

According to the present embodiment, the plant analyzer 1 determines whether or not the over firing operation of the turbine is possible according to the Mahalanobis distance calculated based on the state quantity of the turbine. Since the over firing of the turbine is an operation at a higher load than the base load operation, there is a possibility that degradation other than creep may occur in the component. Therefore, the plant analyzer 1 determines whether or not the over firing operation of the turbine is possible by Mahalanobis distance, thereby it is possible to predict whether or not an abnormality occurs by over firing. Accordingly, the plant analyzer 1 can accurately determines whether or not the over firing operation is possible.

According to the present embodiment, the plant analyzer 1 determines whether or not the over firing operation of the turbine is possible based on whether or not the power selling price is less than a predetermined threshold. That is, the plant analyzer 1 determines that the over filing operation is possible when the power selling price is relatively high. Accordingly, it is possible for the operator to allow the turbine carrying out the over firing operation when the over firing operation is commensurate with the revenue.

According to the present embodiment, the plant analyzer 1 determines whether or not the over firing operation is possible based on a reference including the operable time and at least one of the Mahalanobis distance and the power selling price. As a result, it is possible to more appropriately determine whether or not the over firing operation is possible to carry out as compared with the case of determining whether or not the over firing operation is possible based on only the operable time.

Second Embodiment

The second embodiment will be described in detail below with reference to the drawings The plant analyzer 1 according to the first embodiment determines whether or not the over firing operation should be carried out based on the power selling price of the current time. On the other hand, a plant analyzer 1 according to the second embodiment outputs an operation schedule until the inspection timing based on the power selling price schedule indicating a daily power selling price. In the plant analyzer 1 according to the second embodiment, the plant analyzer 1 and the processing of the determination unit 112 differ from that of the first embodiment.

Here, the determining operation whether or not the over firing operation according to the plant analyzer 1 of the present embodiment is possible will be described. The operation of each of the collection cycles according to the present embodiment is similar to that of the first embodiment.

Figure 6:
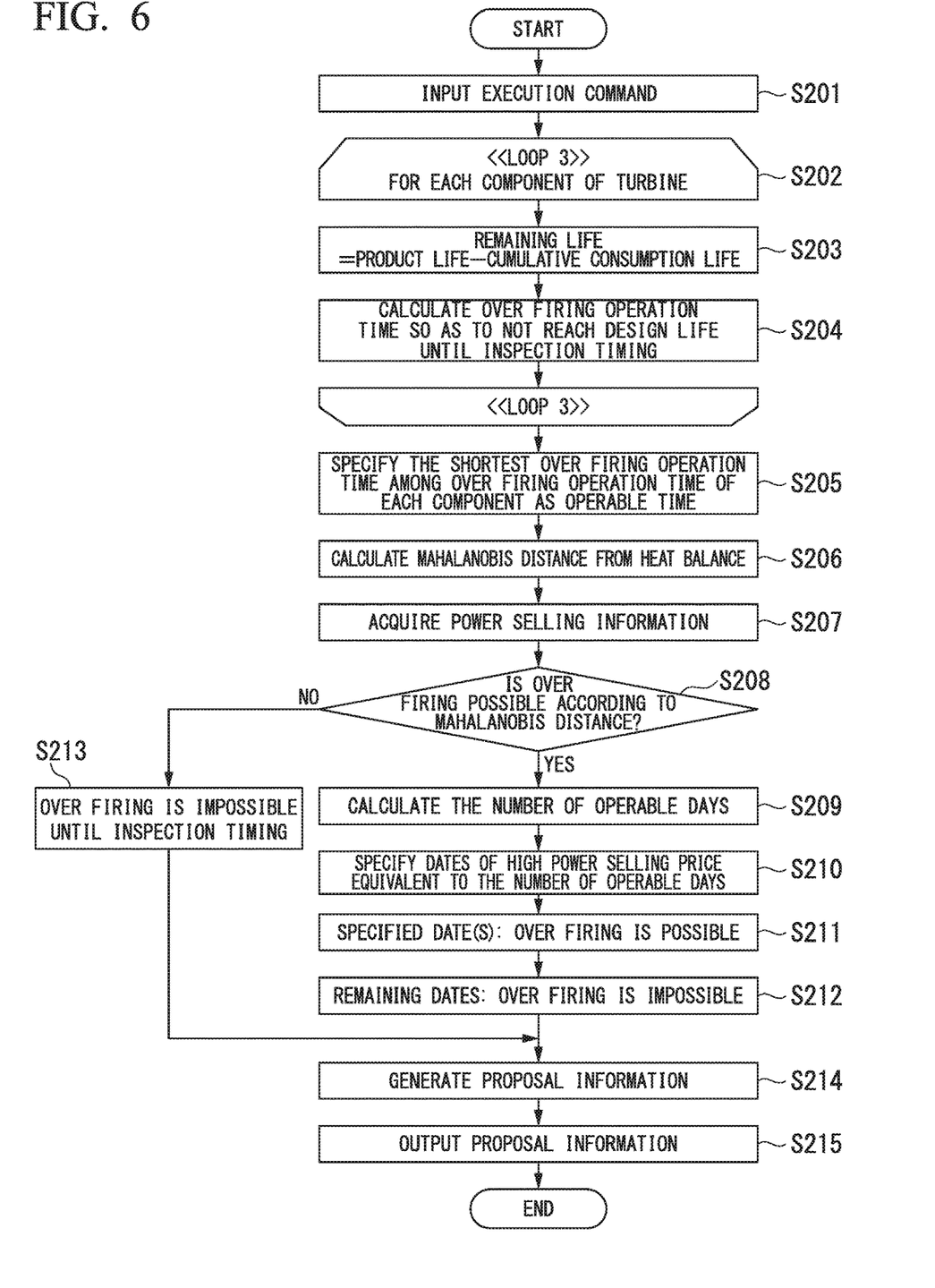
FIG. 6 is a flow chart showing a determining operation whether or not an over firing operation by a plant analyzer according to the second embodiment is possible.

FIG. 6 is a flow chart showing the determination operation whether or not the over firing operation according to the plant analyzer according to the second embodiment is possible.

When the operator inputs the execution command of a processing of determining whether or not the over firing operation is possible in the plant analyzer 1, an input unit 106 receives input of the execution command (Step S201). Next, a time calculation unit 109 selects one component of the turbine one by one, and executes the processing of the steps S203 to S204 shown below far each of the selected components (Step S202).

First, the time calculation unit 109 calculates a remaining life of the selected component by subtracting a cumulative consumption life of the selected component stored in a consumption lite storage unit 105 from the product life of the selected component stored in a component life database 107 (Step S203). Next, the time calculation unit 109 calculates the maximum over firing operation time based on the calculated remaining life and the inspection timing stored in inspection timing storage unit 108 so that the selected component does not reach the design life during a period from the present time to the inspection timing (Step S204).

When the time calculation unit 109 executes the processing from Step S203 to Step S204 for all components, the shortest over firing operation time among the calculated over firing operation time of each component is specified as the operable time which is for preventing the turbine from reaching the product life until the inspection timing (Step S205).

Next, a distance calculation unit 110 calculates a Mahalanobis distance based on the latest heat balance calculated by the heat balance calculation unit 102 (Step S206). Further, a power selling information acquiring unit 111 acquires a power selling price schedule indicating a transition of the daily power selling price as a power selling information (Step S207).

The determination unit 112 determines whether or not the over firing operation of the turbine is possible based on the Mahalanobis distance calculated by the distance calculation unit 110 (Step S208). Specifically, the determination unit 112 determines that the over firing operation should not be carried out in a case where the Mahalanobis distance exceeds a possibility determination threshold value (e.g., 2).

When the determination unit 112 determines that the over firing operation is possible to carry out in a determination based on the Mahalanobis distance (Step S208: YES), the determination unit 112 divides the operable time calculated by the time calculation unit 109 by the operating duration per one day and calculates the number of operable days that is the number of days capable of carrying out the over firing operation (Step S209). Next, the determination unit 112 specifies the dates equivalent to the number of operable days in ascending order of the power selling price from the days during a period from the present to inspection timing based on the power selling price schedule acquired by the power selling information acquiring unit 111 (Step S210). Then, the determination unit 112 determines that the specified dates are the possible days of carrying out the over firing operation (Step S211). Further, the determination unit 112 determines that the remaining dates are the days which should not carry out the over firing operation (Step S212). That is, the determination unit 112 determines whether or not the over firing operation is possible for each day from the present to the inspection timing based on the operable time calculated by the time calculation unit 109 and the power selling price acquired by the power selling information acquiring unit 111.

On the other hand, when the determination unit 112 determines that the over firing operation should not be carried out in a determination based on the Mahalanobis distance (Step S208: NO), the determination unit 112 determines that each day from the present to the inspection timing is a day on which the over firing should not be operated (Step 213).

Next, the output unit 113 generates a proposal information indicating an operation schedule based on the determination result of Step S211 and Step S212 of the determination unit 112, or the determination result of Step S213 (Step S214). That is, the operation schedule proposes the over firing operation on the days determined as a possible day of the over firing operation. The operation schedule proposes the base load operation on the days on which the over firing operation should not be carried out. The output unit 113 outputs the generated proposal information (Step S215).

Figure 7:
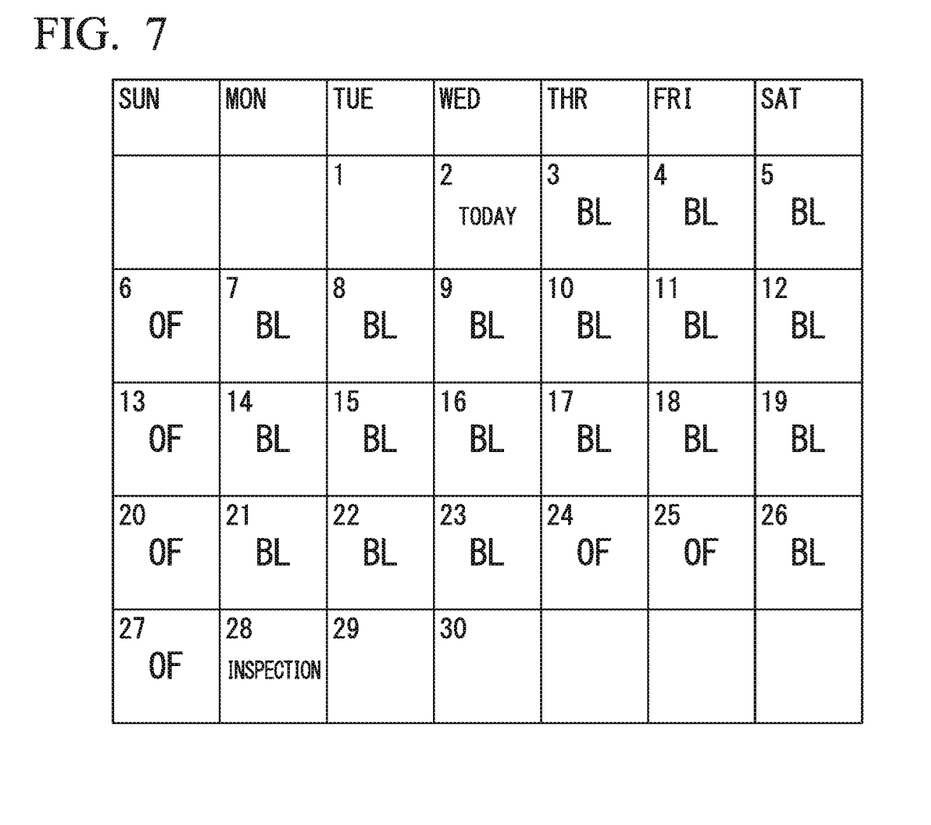
FIG. 7 shows an example of proposal information outputted by the plant analyzer according to the second embodiment.

FIG. 7 is an example of the proposal information outputted by the plant analyzer according to the second embodiment.

As shown in FIG. 7, output unit 113 outputs an operation schedule from present to the inspection timing as the proposal information. The proposal information shown in FIG. 7 proposes an over firing operation on the day of 6, 13, 20, 24, 25, and 27 ("OF (Over Firing)" in FIG. 7), and proposes a base load operation for the remaining days ("BL (Base Load)" in FIG. 7). Accordingly, it is possible for the operator to determine whether or not the turbine is allowed to carry out the over firing operation by referring to the proposal information. In addition, the operator may carry out the over firing operation of the turbine evert in a case where a day is a non-proposed day of the over firing operation in the proposal information.

In this manner, according to the present embodiment, the plant analyzer 1 determines whether or not the over firing operation is possible for each day from the present to the inspection timing based on the operable time and power selling price schedule in the over firing operation. As a result, the plant analyzer 1 can generate the operating schedule with the highest revenue.

Third Embodiment

The third embodiment will be described in detail below with reference to the drawings. The plant analyzer 1 according to the third embodiment further detects a failure of the turbine in addition to the operation of the plant analyzer 1 according to the first embodiment.

Figure 8:
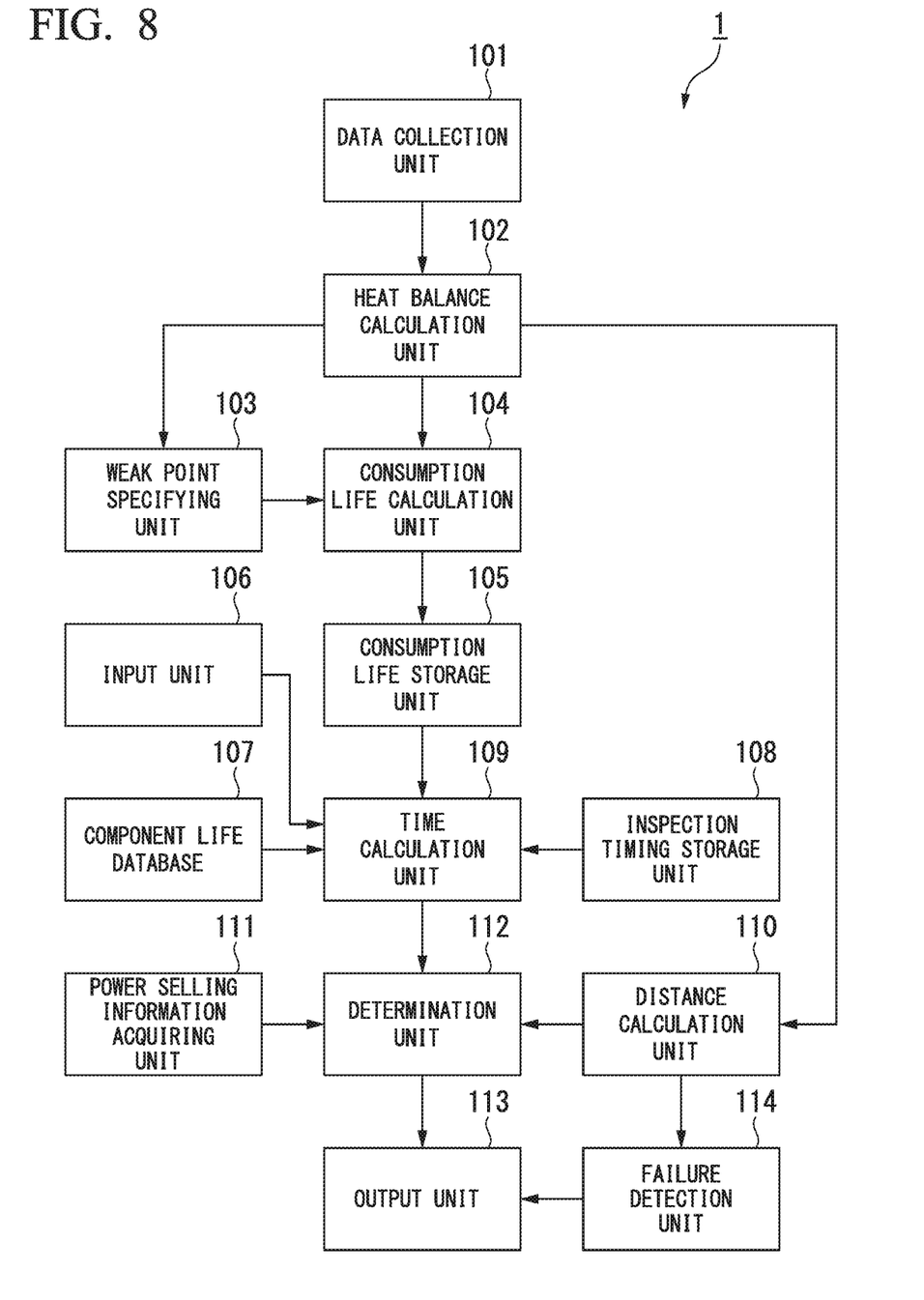
FIG. 8 is a schematic block diagram showing a configuration of a plant analyzer according to a third embodiment.

FIG. 8 is a schematic block diagram showing a configuration of a plant analyzer according to a third embodiment.

The plant analyzer 1 according to the third embodiment further comprises a failure detection unit 114 in addition to the configuration of the first embodiment.

The failure detection unit 114 detects a failure of the turbine by comparing the Mahalanobis distance calculated by the distance calculation unit 110 with a failure detection threshold value. Specifically, the failure detection unit 114 determines that a failure has occurred in the turbine in a case where the calculated Mahalanobis distance exceeds the failure detection threshold value (e.g., 3). Since the over firing operation is an operation with a load exceeding the rated load of the turbine, the possibility of failure, such as damage to the maintenance components occurring in the turbine, is higher than in the base load operation. Therefore, the possibility determination threshold value used in the determination unit 112 is set smaller than the failure detection threshold value used in the failure detection unit 114. In other words, even in a case where the failure detection unit 114 determines that a failure has not occurred, the determination unit 112 may determine that the over firing operation should not be carried out.

Here, an operation of each of the collection cycles according to the present embodiment is explained. In addition, the determination operation of the inspection timing by the plant analyzer 1 according to the present embodiment is the same as the first embodiment.

Figure 9:
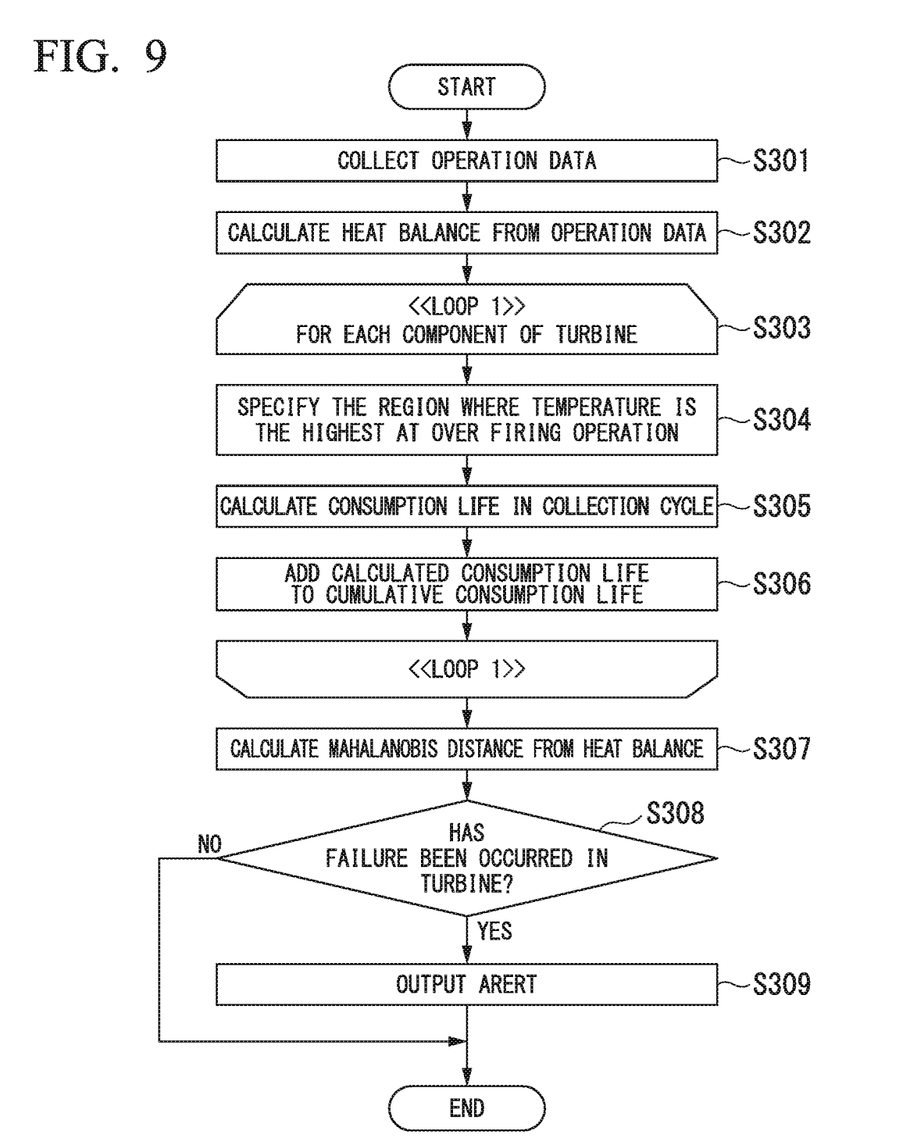
FIG. 9 is a flowchart showing an operation for each collection cycle of the plant analyzer according to the third embodiment.

FIG. 9 is a flow chart showing an operation for each collection cycle of the plant analyzer according to the third embodiment.

The plant analyzer 1 performs the following processing for each collection cycle.

First, the data collection unit 101 collects the operation data of the turbine from a sensor provided in the turbine (Step S301). Next, the heat balance calculation unit 102 calculates the heat balance of the turbine using the collected operation data as an input (Step S302).

Next, the plant analyzer 1 selects components of the turbine one by one, and performs the processing of Step S304 to Step S306 shown below for each of the selected components (Step S303).

First, the weak point specifying unit 103 specifies a region of the selected component that is the highest temperature during the over firing operation based on at least one of the current calculation result and the past calculation result of the heat balance calculation unit 102 (Step S304).

Next, the consumption life calculation unit 104 calculates a consumption life during the latest collection cycle of the selected component using a temperature related to a region specified by the weak point specifying unit 103 in the heat balance calculated by the heat balance calculation unit 102 (Step S305). The consumption life calculation unit 104 adds the calculated consumption life to the cumulative consumption life associated with the selected component stored in the consumption life storage unit 105 (Step S306). As a result, the consumption life calculation unit 104 updates the cumulative consumption life stored in the consumption life storage unit 105.

When the plant analyzer 1 executes the processing from Step S304 to Step S306 for all of the components, the distance calculation unit 110 the Mahalanobis distance based on the heat balance calculated by the heat balance calculation unit 102 (Step S307).

Next, the failure detection unit 114 determines whether or not there is a failure in the turbine based on the Mahalanobis distance calculated by the distance calculation unit 110 (Step S308). Specifically, the determination unit 112 determines that a failure has occurred in the turbine, in a case where the Mahalanobis distance exceeds the failure detection threshold value (e.g., 3). When a failure has occurred in the turbine (Step S308; YES), the output unit 113 outputs all alert indicating that a failure has occurred in the turbine (Step S309). On the other hand, when no failure has occurred in the turbine (Step S308: NO), the processing is terminated.

As described above, according to the present embodiment, the failure detection unit 114 determines whether or not there is a failure of the turbine based on the Mahalanobis distance calculated by the distance calculation unit 110. As a result, the plant analyzer 1 can determine whether or not the over firing operation is possible and can detect whether or not there is a failure of the turbine.

In addition, the plant analyzer 1 according to the present embodiment further includes the failure detection unit 114 in the configuration of the first embodiment; however the present invention is not limited thereto. For example, the plant analyzer 1 of another embodiment may further include a failure detection unit 114 in the configuration of the second embodiment.

Although the drawings have been described in detail with reference to the drawings, specific configurations are not limited to those described above, and various design changes can be made.

For example, in the above-described embodiment, the weak point specifying unit 103 specifies the region where the temperature is highest at the over firing operation; however, it is not limited thereto. For example, in another embodiment, the highest temperature region in the over firing operation may specified in advance by a turbine designer or the like. Further, the consumption life calculation unit 104 according to still another embodiment may calculate the LMP value based on other temperatures such as an average temperature of the component, not at the temperature of the region where the temperature is highest at the over firing operation.

Further, in the above embodiment, the plant analyzer 1 uses the LMP value as a temperature history variable to determine whether or not the component will reach the life of the component by the creep deformation; however, it is not limited thereto. For example, another embodiment may use other temperature history variables. For example, a plant analyzer 1 according to the other embodiment may use a temperature history variable indicating a relationship between a temperature and the number of cycles to determine whether or not a component reaches a life by low-cycle fatigue. Further, the plant analyzer 1 according to still another embodiment may use a plurality of temperature history variables to determine whether or not a component reach a life based on a plurality of deterioration reasons, such as creep deformation and low-cycle fatigue.

Also, in the embodiments described above, based on the over firing operation time for each component constituting the turbine, the plant analyzer 1 calculates the operable time at the over firing operation of the entire turbine; however, it is not limited thereto. For example, the plant analyzer 1 according to another embodiment may directly calculate the operable time at the over firing operation of the entire turbine based on the design life of the entire turbine, without calculating the over firing operation time of each component.

In the above-described embodiment, the weak point specifying unit 103, the consumption life calculation unit 104, and the distance calculation unit 110 calculate based on the heat balance calculated by the heat balance calculation unit 102; however, it is not limited thereto. For example, in another embodiment, at least one of the weak point specifying unit 103, the consumption life calculation unit 104, and the distance calculation unit 110 may perform calculations based on the operation data collected by the data collection unit 101.

In particular, in another embodiment, when all of the weak point specifying unit 103, the consumption life calculation unit 104, and the distance calculation unit 110 perform calculations based on the operation data collected by data collection unit 101, the plant analyzer 1 may not be provided the heat balance calculation unit 102.

Figure 10:
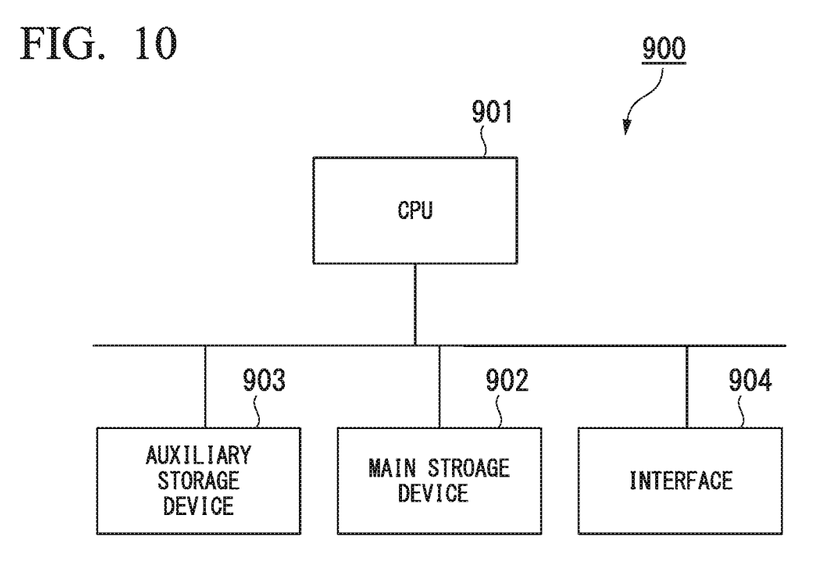
FIG. 10 is a schematic block diagram illustrating a computer configuration according to at least one embodiment.

FIG. 10 is a schematic block diagram showing a configuration of a computer according to at least one embodiment.

The computer 900 includes a GPU 901, a main storage device 902, an auxiliary storage device 903, and an interface 904.

The plant analyzer 1 described above is implemented in the computer 900. The operation of each of the above-described processing units is stored in the auxiliary storage device 903 in the form of a program. The CPU 901 reads out the programs from the auxiliary storage device 903 to the main storage device 902 and executes the process according to the programs. In accordance with the programs, the CPU secures a storage area corresponding to the inspection timing storage unit 108 and the consumption life storage unit 105 in main storage device 902. In accordance with the programs, the GPU 901 secures a storage area corresponding to the component life database 107 to the auxiliary storage device 903.

In addition, in at least one embodiment, the auxiliary storage device 903 is an example sample of a non-transitory tangible medium. Other examples of non-transitory tangible media include a magnetic disk, a magneto-optical disk, a CD-ROM, a DVD-ROM, a semiconductor memory, etc. connected via the interface 904. When the program is delivered to the computer 900 via a communication line, the computer 900 that has received the delivery may develop the program in the main storage device 902 and may execute the above processes.

The program may also be used to realize part of the functions mentioned above. Further, the program may be a difference file (difference program) that realizes the above-described function in combination with other programs already stored in the auxiliary storage device 903.

INDUSTRIAL APPLICABILITY

The plant analyzer can accurately determine whether or not an operation in the over firing operation is possible.

EXPLANATION OF REFERENCE SIGN

1: Plant Analyzer
101: Data Collection Unit
102: Heat Balance Calculation Unit
103: Weak Point Specifying Unit
104: Consumption Life Calculation Unit
105: Consumption Life Storage Unit
106: Input Unit
107: Component Life Database
108: Inspection Timing Storage Unit
109: Time Calculation Unit
110 Distance Calculation Unit
111: Power Selling Information Acquiring Unit
112: Determination Unit
113: Output Unit
114: Failure Detection Unit
900: Computer
901: CPU
902: Main Storage Device
903: Auxiliary Storage Device
904: Interface

The invention claimed is:

1. A plant-analyzing computer in which a plant analyzer is implemented and which comprises an auxiliary storage device and a processor,
wherein the auxiliary storage device is configured to store programs, which are read out by the processor,
wherein the processor is configured to execute the programs and control the plant analyzer to:
acquire state quantities of a turbine using a sensor;
calculate an operable time at an over firing operation of the turbine based on a design life of the turbine and the state quantities;
calculate a Mahalanobis distance based on a calculated heat balance, wherein the calculated heat balance is a state quantity;

determine whether or not the over firing operation of the turbine is possible by the Mahalanobis distance and the operable time, and determine results of the over firing operation should not be carried out when the operable time is less than a predetermined time and the over firing operation should not be carried out when the Mahalanobis distance exceeds a possibility determination threshold value; and output proposal information indicating the results on a display.

2. The plant-analyzing computer according to claim 1, wherein the processor is further configured to execute the programs and control the plant analyzer to determine whether or not the over firing operation of the turbine is possible by whether or not a power selling price is less than a predetermined threshold value, the Mahalanobis distance and the operable time.

3. The plant-analyzing computer according to claim 1, wherein the processor is further configured to execute the programs and control the plant analyzer to:

calculate a history variable with respect to a history of the state quantities; and calculate the operable time at the over firing operation of the turbine based on a history variable corresponding to the design life of the turbine and the calculated history variable.

4. The plant-analyzing computer according to claim 1, wherein the processor is further configured to execute the programs and control the plant analyzer to detect a fault of the turbine based on the Mahalanobis distance calculated.

5. A plant analysis method causing a processor of a plant-analyzing computer in which a plant analyzer is implemented to execute steps of:

acquiring state quantities of a turbine including a temperature of the turbine using a sensor;

calculating an operable time at an over firing operation of the turbine based on a design life of the turbine and calculated state quantities;

calculating a Mahalanobis distance based on a calculated heat balance, wherein the calculated heat balance is a state quantity; and determining whether or not the over firing operation of the turbine is possible by the Mahalanobis distance and the operable time, wherein, in the step of determining, determine results of the over firing operation should not be carried out when the operable time is less than a predetermined time, and the over firing operation should not be carried out when the Mahalanobis distance exceeds a possibility determination threshold value; and output proposal information indicating the results on a display.

6. A non-transitory computer-readable computer medium storing programs that are read out by a processor of a plant-analyzing computer in which a plant analyzer is implemented and that causes the processor to execute:

acquiring state quantities of a turbine using a sensor;

calculating an operable time at an over firing operation of the turbine based on a design life of the turbine and the state quantities;

calculating a Mahalanobis distance based on a calculated heat balance, wherein the calculated heat balance is a state quantity; and determining whether or not the over firing operation of the turbine is possible by the Mahalanobis distance and the operable time, determining results of the over firing operation should not be carried out when the operable time is less than a predetermined time and the over firing operation should not be carried out when the Mahalanobis distance exceeds a possibility determination threshold value; and output proposal information indicating the results on a display.

\* \* \* \* \*